(12) United States Patent
Chandran et al.

(10) Patent No.: US 10,168,479 B2
(45) Date of Patent: Jan. 1, 2019

(54) METHOD AND APPARATUS FOR MODIFYING DIMENSIONS OF A WAVEGUIDE

(71) Applicant: Indian Institute of Technology Madras, Chennai (IN)

(72) Inventors: Sujith Chandran, Chennai (IN); Subramanian Meenatchi Sundaram, Chennai (IN); Bijoy Krishna Das, Chennai (IN)

(73) Assignee: INDIAN INSTITUTE OF TECHNOLOGY MADRAS, Chennai, TN (IN)

( * ) Notice: Subject to any disclaimer, the term of this patent is extended or adjusted under 35 U.S.C. 154(b) by 0 days.

(21) Appl. No.: 15/218,300

(22) Filed: Jul. 25, 2016

(65) Prior Publication Data

US 2017/0023737 A1    Jan. 26, 2017

(30) Foreign Application Priority Data

Jul. 23, 2015   (IN) ............................ 3799/CHE/2015

(51) Int. Cl.
*G02B 6/136*    (2006.01)
*G02B 6/122*    (2006.01)
*G02B 6/12*     (2006.01)

(52) U.S. Cl.
CPC ............. *G02B 6/136* (2013.01); *G02B 6/122* (2013.01); *G02B 6/1228* (2013.01); *G02B 2006/12061* (2013.01)

(58) Field of Classification Search
None
See application file for complete search history.

(56) References Cited

U.S. PATENT DOCUMENTS

| 2004/0042751 A1* | 3/2004 | Blalock ................. G02B 6/125 385/129 |
| 2005/0053346 A1* | 3/2005 | Deng ...................... G02B 6/12 385/129 |
| 2008/0264910 A1* | 10/2008 | Kashyap ............ B23K 26/0613 219/121.61 |

* cited by examiner

*Primary Examiner* — Duy Vu N Deo

(57) ABSTRACT

Embodiments herein provide method and apparatus for modifying dimensions of a waveguide. The method includes positioning a shadow mask, with an aperture, above the waveguide, fabricated on a substrate. Further, the method includes spatially filtering, a substance through the aperture in the shadow mask on a portion of the waveguide. Furthermore, the method includes obtaining an adiabatic spot size converter at least at one end of the waveguide by adjusting a distance between the shadow mask and a surface of the waveguide to modify the dimensions of the waveguide.

13 Claims, 11 Drawing Sheets

(d)

METHOD AND APPARATUS FOR MODIFYING DIMENSIONS OF A WAVEGUIDE

TECHNICAL FIELD

The present invention relates to semiconductor device fabrication techniques, and more particularly to a method and apparatus for modifying dimensions of a waveguide. The present application is based on, and claims priority from an Indian Application Number 3799/CHE/2015 filed on 23 Jul. 2015, the disclosures of which are hereby incorporated by reference.

BACKGROUND

Optical waveguide (passive/active) is basic building blocks for high-speed on-chip optical interconnect devices. A core-size and cross-sectional geometry of the waveguide plays vital role in terms of light coupling efficiency, dispersion, nonlinear interactions and polarization dependencies. Nevertheless, higher refractive index contrast between core and cladding of a silicon-on-insulator (SOI) based waveguides facilitates a realization of ultra-compact photonics device structures resulting into large scale integration and multifunctional integrated optoelectronic chip (IOC).

However, challenges associated with small cross-section waveguides (microns to sub-micron) are the uniformity over large propagation lengths (ranging from few tens of micrometer to few millimeters), core-cladding interface roughness and overall fabrication reproducibility.

Therefore, various post-fabrication trimming techniques have been proposed to compensate phase errors resulting out of process related uncertainties and non-uniformities in waveguide dimensions. Some attractive local refractive index trimming techniques have been reported during the post-fabrication treatments to detune the wavelength dependent characteristics of waveguide device. However, the local refractive index trimming techniques can not modify the dimensions of the waveguide during a design phase.

SUMMARY

Accordingly the embodiments herein disclose a method for modifying dimensions of a waveguide. The method includes positioning a shadow mask, with an aperture, above the waveguide, fabricated on a substrate. Further, the method includes spatially filtering, a substance through the aperture in the shadow mask on a portion of the waveguide. Furthermore, the method includes obtaining an adiabatic spot size converter at least at one end of the waveguide, by adjusting a distance between the shadow mask and a surface of the waveguide, to modify the dimensions of the waveguide.

Accordingly the invention discloses an apparatus for modifying dimensions of a waveguide. The apparatus is configured to position a shadow mask, with an aperture, above the waveguide, fabricated on a substrate. The apparatus is configured to spatially filter a substance through the aperture in the shadow mask on a portion of the waveguide. The apparatus is configured to obtain an adiabatic spot size converter at least at one end of the waveguide, by adjusting a distance between the shadow mask and the waveguide, to modify the dimensions of the waveguide.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1A:
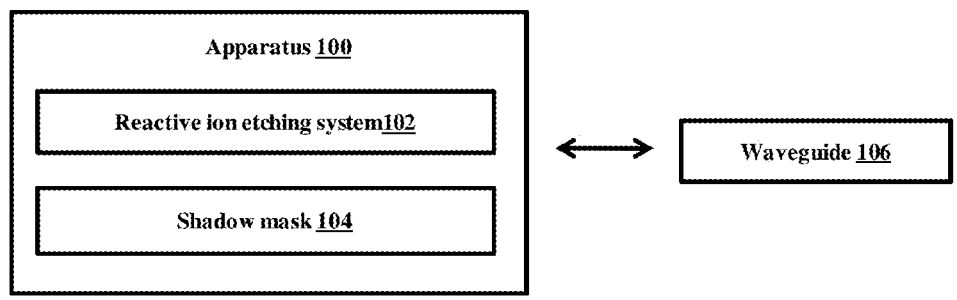
FIG. 1a is a schematic of an apparatus configured for modifying dimensions of a waveguide, according to the embodiments as disclosed herein.

The embodiments herein and the various features and advantageous details thereof are explained with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The embodiments herein achieve a method and apparatus for modifying dimensions of a waveguide. In an embodiment, the dimensions of the waveguide are length of the waveguide, width of the waveguide, height of the waveguide, and cross-section of the waveguide.

The method includes positioning a shadow mask, with an aperture, above the waveguide, fabricated on a substrate. Further, the method includes spatially filtering, a substance through the aperture in the shadow mask on a portion of the waveguide. In an embodiment, the portion of the waveguide is trimmed by spatially filtering reactive plasma through the aperture of the shadow mask to reduce the dimensions of a core of the waveguide. The portion of the waveguide is trimmed along an axis of the waveguide. The portion of the waveguide may be trimmed using a reactive ion etching process. In an embodiment, the width of the waveguide and the height of the waveguide are reduced based on a composition of the reactive plasma.

In another embodiment, the portion of the waveguide is deposited with a vaporized material, spatially filtered through the aperture of the shadow mask, to modify a cladding of the waveguide. The portion of the waveguide is deposited with the vaporized material along the axis of the waveguide.

Further, a length of the aperture is adjusted to control length of the portion of the waveguide to be modified. The length of the waveguide, the width of the waveguide, the height of the waveguide, and the cross-section of the waveguide are modified simultaneously. The width of the waveguide and the height of the waveguide may be reduced at a rate which is controlled separately.

Furthermore, the method includes obtaining an adiabatic spot size converter at one or more ends of the waveguide, by adjusting a distance between the shadow mask and a surface of the waveguide, to modify the dimensions of the waveguide. The substance penetrates through a gap between the shadow mask and the surface of the waveguide to obtain the adiabatic spot size converters at the end of the waveguide.

In an embodiment, the waveguide is single mode throughout structure of the waveguide comprising modified and unmodified sections.

Unlike conventional methods, the proposed method provides a way to engineer effective refractive index, dispersion characteristics, and mode-size simultaneously at any desired location of pre-defined single-mode silicon-on-insulator (SOI) waveguide.

The length of uniformly trimmed waveguide section is controlled by adjusting the length of the shadow mask aperture alone. Thus, the core dimensions are reduced adiabatically, (i.e., single-mode guiding condition is maintained throughout the waveguide length without any significant increase in an insertion loss). The propagation loss of the trimmed waveguide is not changed significantly. For example, the propagation loss may be 0.15-0.30 dB/mm (nearly polarization independent).

The proposed method can modify a core and/or a cladding of the waveguide by simultaneous formation of adiabatic spot-size converters at both ends of the waveguides.

The method can also be used to deposit desired cladding material in desired locations. The height of the shadow mask from the surface of the waveguide controls the length of vertically tapered cladding thickness. The proposed method is not only limited to a silicon platform but is also applicable for all planar light-wave circuits.

Referring now to the drawings and more particularly to FIGS. 1 through 8d, where similar reference characters denote corresponding features consistently throughout the figure, there are shown preferred embodiments.

FIG. 1a is a schematic of an apparatus 100 configured for modifying dimensions of a waveguide 106, according to the embodiments as disclosed herein. The dimensions of the waveguide 106 can be, but are not limited to, length of the waveguide 106, width of the waveguide 106, height of the waveguide 106, and cross-section of the waveguide 106. The apparatus 100 includes a reactive ion etching system 102, and a shadow mask 104. The apparatus 100 is configured to position the shadow mask 104 above the waveguide 106. The shadow mask 104 is fabricated with an aperture in the center. In an embodiment, the aperture may be a rectangular aperture, a square aperture, a circular aperture, and the like. The waveguide 106 is fabricated on a substrate. The substrate may be made of a silicon based material.

After positioning the shadow mask 104 above the waveguide 106, the apparatus 100 is configured to spatially filter a substance through the aperture in the shadow mask 104 on a portion of the waveguide 106.

In an embodiment, the substance is a reactive plasma which etches or trims the portion of the waveguide 106. When the reactive plasma comes in contact with the portion of the waveguide 106, the portion is etched due to a chemical reaction between the reactive plasma and material of a core of the waveguide 106. The portion of the waveguide 106 is trimmed by spatially filtering the reactive plasma through the aperture of the shadow mask 104 to reduce the dimensions of the core of the waveguide 106. The portion of the waveguide 106 is trimmed along an axis of the waveguide 106. In an embodiment, the portion of the waveguide 106 is trimmed using the reactive ion etching process. In an embodiment, the width of the waveguide 106 and the height of the waveguide 106 are reduced at a rate based on a composition of the reactive plasma.

Figure 1B:
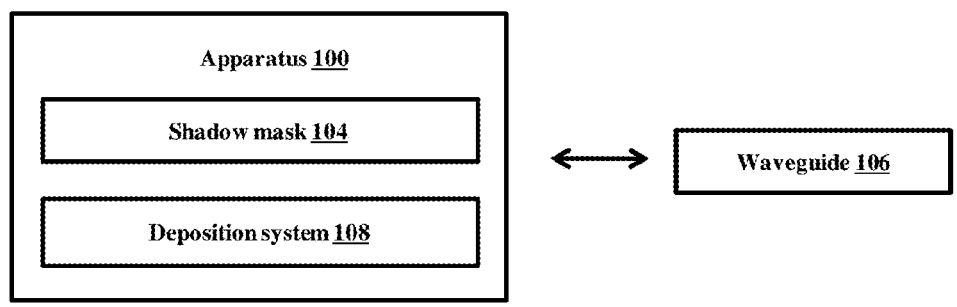
FIG. 1b is a schematic of another apparatus for modifying dimensions of the waveguide, according to the embodiments as disclosed herein.

FIG. 1b is a schematic of another apparatus 100 configured for modifying dimensions of the waveguide 106, according to the embodiments as disclosed herein. The apparatus 100 includes a shadow mask 104 and a deposition system 108. The apparatus 100 is configured to position the shadow mask 104 above the waveguide 106. The shadow mask 104 is fabricated with the aperture in the middle. In an embodiment, the aperture may be the rectangular aperture, the square aperture, the circular aperture, and the like. The waveguide 106 is fabricated on the substrate. The substrate may be made of silicon or any other suitable material.

After positioning the shadow mask 104 above the waveguide 106, the apparatus 100 is configured to spatially filter the substance through the aperture in the shadow mask 104 on the portion of the waveguide 106.

In an embodiment, the substance is a vaporized material deposited on the portion of the waveguide 106. The vaporized material is deposited as a cladding of the waveguide 106. The portion of the waveguide 106 is deposited with the cladding material, spatially filtered through the aperture of the shadow mask 104, to modify the cladding of the waveguide 106.

The portion of the waveguide 106 is deposited with the cladding material along the axis of the waveguide 106. The deposition system 108 is configured with the shadow mask 104 to control length of the portion of the waveguide to be modified.

The dimensions of the waveguide (i.e., the length of the waveguide, the width of the waveguide, the height of the waveguide, and the cross-section of the waveguide) are modified simultaneously. Further, the waveguide width and height reduction rate can be controlled separately.

Further, the apparatus 100 is configured to obtain the adiabatic spot size converter at one or more ends of the waveguide by adjusting a distance between the shadow mask 104 and the waveguide 106. In an embodiment, the substance penetrates through a gap between the shadow mask 104 and a surface of the waveguide 106 to obtain the adiabatic spot size converter at one or more ends of the waveguide 106. In an embodiment, the waveguide 106 can be a single mode waveguide, where a structure of the waveguide 106 includes a modified section and an unmodified section.

The apparatus 100 is designed such that individual non-linear functions can be easily insulated by introducing relatively larger cross-section (untrimmed) waveguides in between. The overall loss budget for untrimmed/trimmed waveguides and SSCs can be further reduced by better Reactive Ion Etching (RIE) chemistry. The apparatus 100 can also be used for modifying dimensions of the integrated optics/optoelectronic devices.

Figure 2:
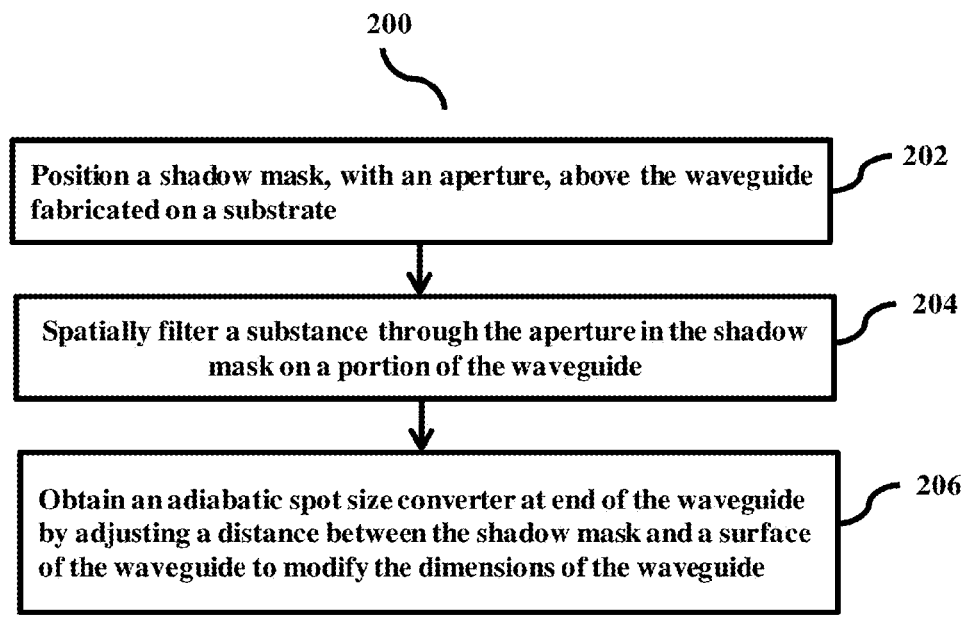
FIG. 2 is a flow diagram illustrating a method for modifying dimensions of a waveguide, according to the embodiments as disclosed herein.

FIG. 2 is a flow diagram illustrating a method for modifying dimensions of the waveguide 106, according to the embodiments as disclosed herein.

At the step 202, the method 200 includes positioning the shadow mask 106 with the aperture above the waveguide 106. The waveguide 106 is fabricated on the substrate. At the step 204, the method 200 includes spatially filtering the substance through the aperture in the shadow mask 106 on a portion of the waveguide.

In an embodiment, the substance is the reactive plasma which etches or trims the portion of the waveguide 106. When the reactive plasma comes in contact with the portion of the waveguide 106, the portion is etched due to the chemical reaction between the reactive plasma and material of the core of the waveguide 106. The portion of the waveguide 106 is trimmed by spatially filtering the reactive plasma through the aperture of the shadow mask 104 to reduce the dimensions of the core of the waveguide 106. The portion of the waveguide 106 is trimmed along the axis of the waveguide 106. In an embodiment, the portion of the waveguide 106 is trimmed using the reactive ion etching process. In an embodiment, the width of the waveguide 106 and the height of the waveguide 106 are reduced based on a composition of the reactive plasma.

In another embodiment, the substance is the vaporized material deposited on the portion of the waveguide 106. The vaporized material is deposited as a cladding of the waveguide 106. The deposition system 108 is configured with the shadow mask 104 to control length of the portion of the waveguide 106 to be modified. The portion of the waveguide 106 is deposited with the cladding material, spatially filtered through the aperture of the shadow mask 104, to modify the cladding of the waveguide 106.

At the step 206, the method 200 includes obtaining an adiabatic spot size converter at one or more ends of the waveguide 106, by adjusting the distance between the shadow mask 104 and the surface of the waveguide 106.

The various actions, acts, blocks, steps, and the like in method 200 may be performed in the order presented, in a different order or simultaneously. Further, in some embodiments, some actions, acts, blocks, steps, and the like may be omitted, added, modified, skipped, and the like without departing from the scope of the invention.

FIG. 3a to FIG. 3f represent a process flow for fabrication of the waveguide and surface trimming of the waveguide using a shadow mask with an adiabatic vertical as well as horizontal tapering at both ends of the waveguides, according to the embodiments as disclosed herein. As shown in the FIG. 3a, a rib waveguide width is defined by e-beam/uv lithography using a negative/positive tone e-beam resist/photoresist. Initially, a single mode rib waveguide ($L_{tot}$~15 mm) is fabricated in the SOI substrate having handle wafer thickness of 500±10 μm, device layer thickness ($H_0$) of 2±0.5 μm and a BOX layer thickness of 1 μm±5%.

Figure 3A:
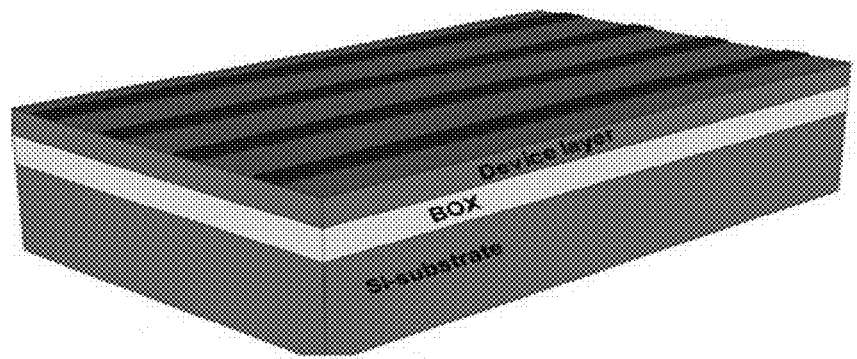
FIG. 3a to FIG. 3f represent a process flow for fabrication of the waveguide and surface trimming of the waveguide using a shadow mask with an adiabatic vertical as well as horizontal tapering at both ends of the waveguides, according to the embodiments as disclosed herein.
Figure 3B:
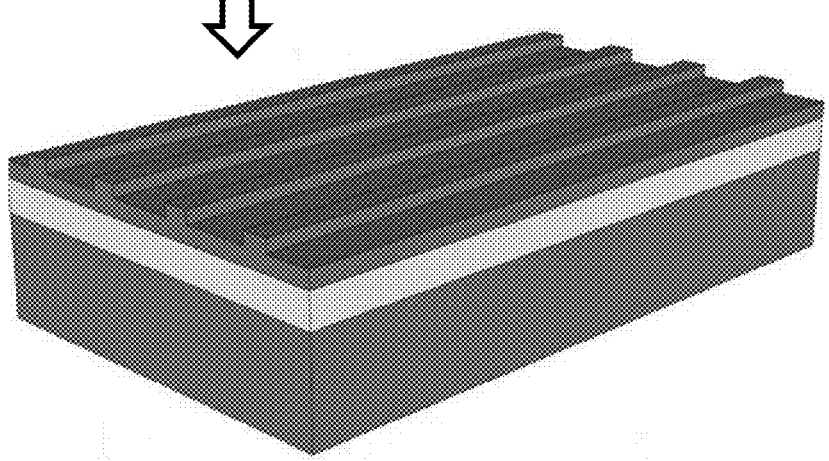

The FIG. 3b represents a schematic view of an initial rib waveguide (after first RIE and the removal of the resist mask). The width ($W_0$=1.7 μm) of the waveguide 106 is defined by e-beam lithography using the negative tone resist Hydrogen Silsesquioxane (HSQ) of thickness ~100 nm. Subsequently, a standardized RIE process (gas flow rate=$SF_6$ Ar::20:20 sccm, chamber pressure=250 mT, RF power=150 W are carried out to obtain slab height $h_0$ (etch depth $H_0$–$h_0$) of 1.6±0.5 μm (0.4 μm). The etching depth is carefully chosen so that single-mode guidance is not violated even for a device layer thickness variation of plus or minus 0.5 μm.

Figure 3C:
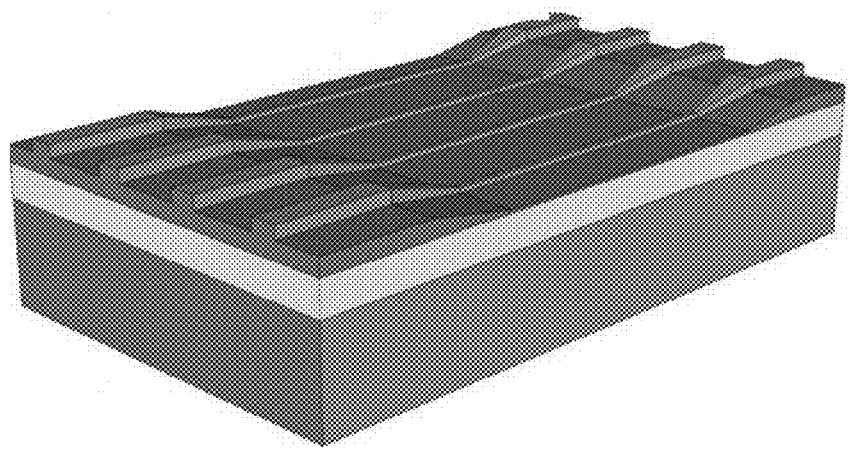

The FIG. 3c represents a schematic view of an adiabatically integrated trimmed waveguide 106 (after a second RIE using the shadow mask 104 with the rectangular aperture). A second RIE chemistry (gas flow rate—SF6:Ar::25:25 sccm, chamber pressure=250 mT, RF Power=150 W are used for a localized surface trimming (defined by shadow mask 104 with the rectangular shaped slit/aperture) which eventually offers the waveguide height reduction rate of ~0:28 μm/min and top width reduction rate of ~0:23 μm/min.

Figure 3D:
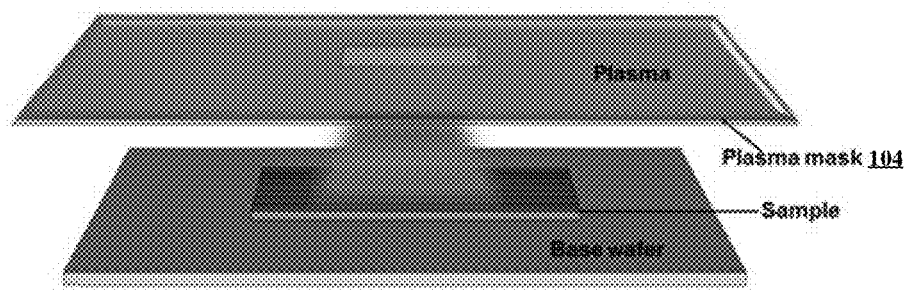

The FIG. 3d represents a spatial filtering scheme for the reactive plasma using the shadow mask 104 with the rectangular slit aperture. As the shadow mask 104 is placed above the waveguide surface with an adjustable height (typically ~100 μm), a uniform plasma flux may be spatially filtered on the sample surface of area same as the shadow mask aperture and a penetrating graded plasma flux at the boundaries. The shadow mask 104 has been designed such that its aperture size can be varied according to the requirement of waveguide length to be trimmed. The penetrated graded plasma flux beneath the shadow mask boundaries helps to form adiabatic SSCs at both ends of trimmed waveguides (as shown in the FIG. 3c). Thus, uniformly trimmed waveguides with a height (width) reduction of 1.1 μm (0.85 μm) of three different lengths (3 mm, 5 mm, and 7 mm) terminating with adiabatic SSCs of lengths ~1 mm at both ends is obtained.

Figure 3E:
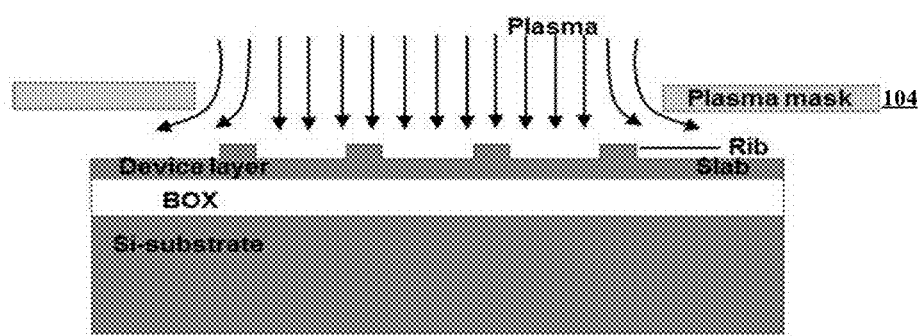
Figure 3F:
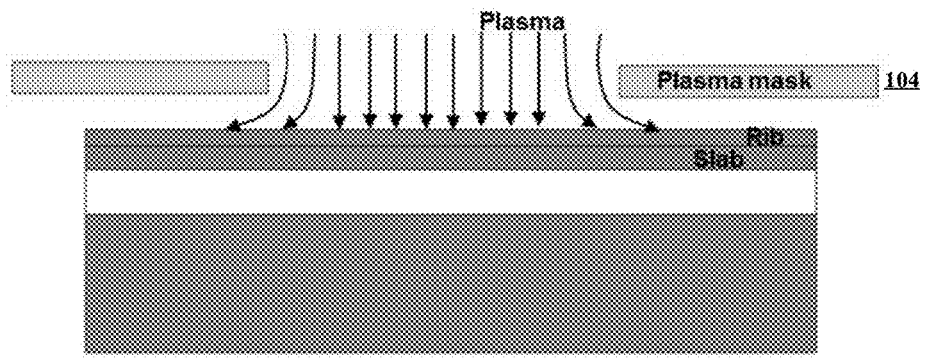

The FIG. 3e represents a cross-sectional view of the masking scheme during the second RIE. The FIG. 3f represents a lateral view of the masking scheme during the second RIE forming the adiabatic SSCs at both ends of trimmed waveguide 106.

Figure 4A:
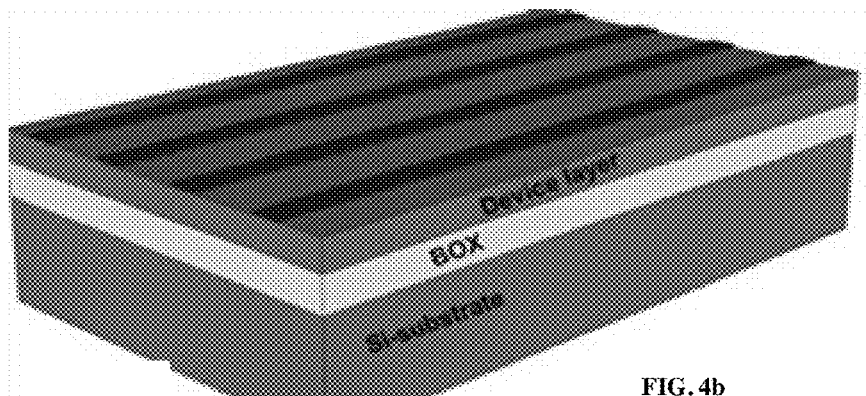
FIG. 4a to FIG. 4f represent a process flow for fabrication of the waveguide and deposition of a vaporized material on a waveguide cladding with an adiabatic vertical tapering at both ends of the waveguides, according to the embodiments as disclosed herein.
Figure 4B:
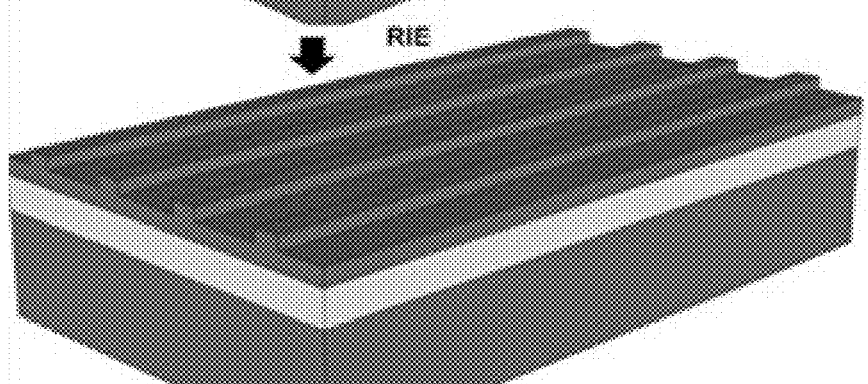

FIG. 4a to FIG. 4f represent a process flow for fabrication of the waveguide 106 and deposition of the vaporized material on the waveguide cladding with an adiabatic vertical tapering at both ends of the waveguide 106, according to the embodiments as disclosed herein. The FIG. 4a represents lithographic definition of initial waveguide using negative tone e-beam resist HSQ. The FIG. 4b represents removal of resist mask from the waveguide after the RIE process.

Figure 4C:
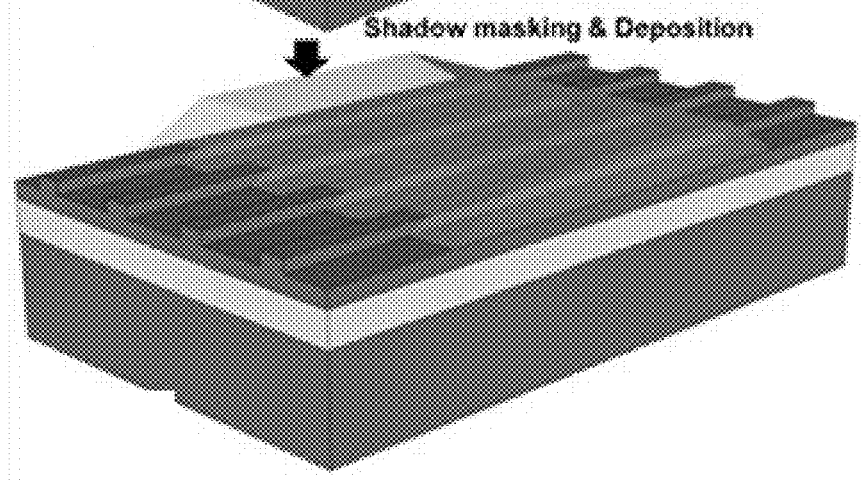
Figure 4D:
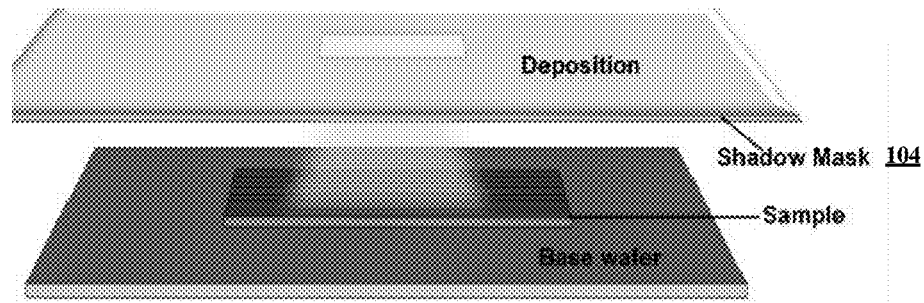

The FIG. 4c represents physical (shadow) masking and deposition of cladding material. The FIG. 4d represents a spatial filtering of reactive plasma using the shadow mask 104. Here, the shadow mask 104 is placed above the waveguide 106. The waveguide 106 is fabricated on the substrate. The substrate is made of silicon. The apparatus 100 is configured to spatially filter the substance through the aperture in the shadow mask 104 on a portion of the waveguide 106. The substance can be the vaporized material deposited on the portion of the waveguide.

The substance penetrates through the gap between the shadow mask 104 and the surface of the waveguide 106 to obtain the adiabatic spot size converter at one or more ends of the waveguide 106. The deposition system 108 is configured with the shadow mask 104 to control length of the portion of the waveguide 106 to be modified.

Figure 4E:
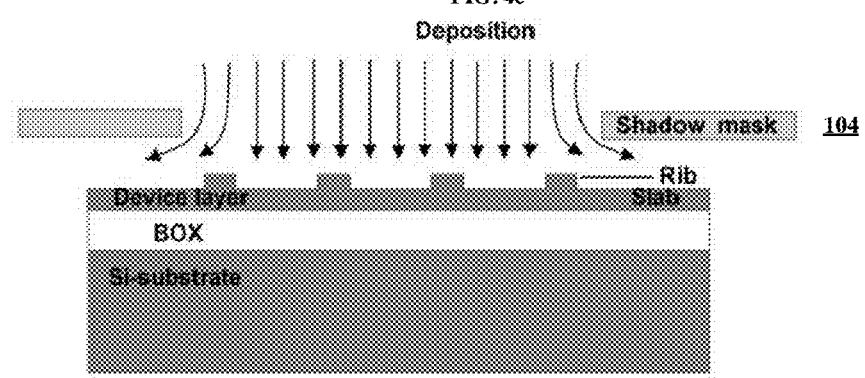
Figure 4F:
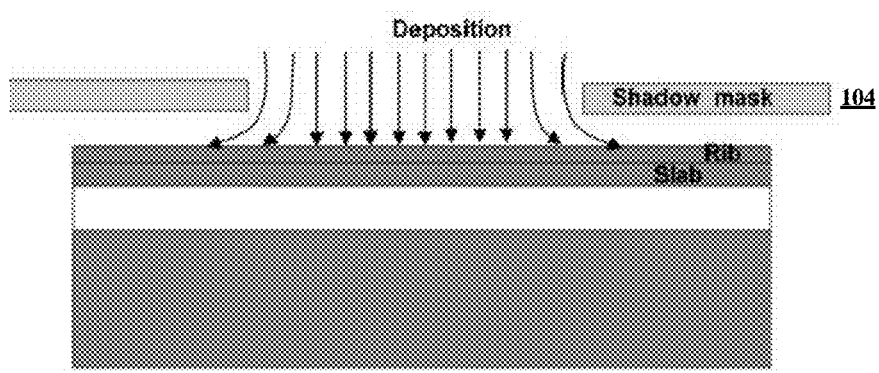

The FIG. 4e represents a cross-sectional view of the waveguide 106 during the deposition process. The FIG. 4f represents lateral view of the waveguide 106 during the deposition of the cladding material.

Figure 5:
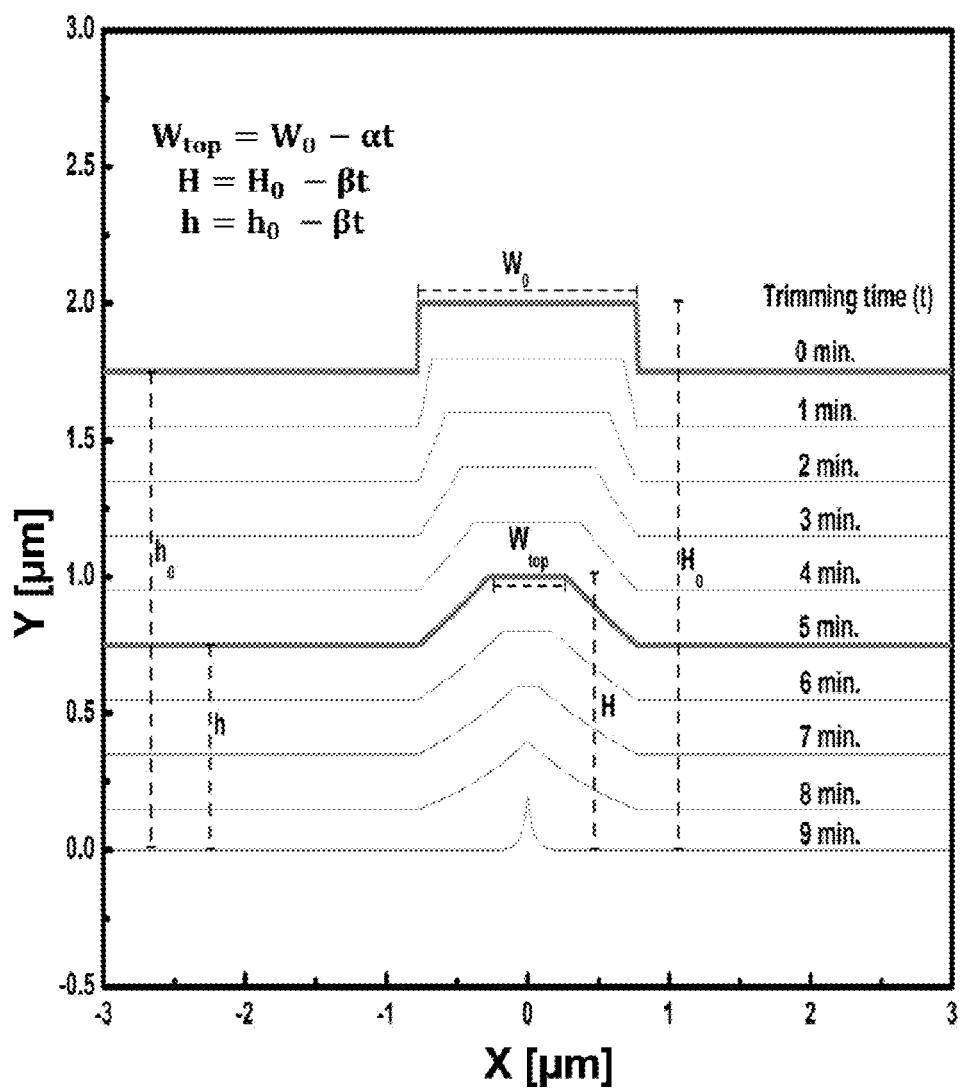
FIG. 5 is a graph showing cross-sectional profiles of surface trimmed waveguides, according to the embodiments as disclosed herein.

FIG. 5 is a graph showing cross-sectional profiles of surface trimmed waveguides 106, according to the embodiments as disclosed herein. Initially, a submicron waveguide cross-section with a starting 2 µm device layer thickness is derived. After fabricating an initial single-mode waveguide using standard fabrication techniques, the surface trimmed waveguide 106 of a desired length terminating with adiabatic SSCs (insignificant insertion loss and single-mode guidance throughout) can be derived by a single isotropic reactive ion etching (RIE) process. As the waveguide core-size reduces as a function of etching time, the original geometry of the waveguide cross-section modifies into an approximate trapezoidal and finally an approximate triangular shape. The same model is used to derive trimmed submicron waveguide cross-sections at various instances of etching duration. The simulated results are presented in the FIG. 5. Here, the contour lines represents cross-sections of the waveguide 106 at various instants of the RIE, where $W_0=1.55$ µm, $H_0=2$ µm, $h_0=1.75$ µm. The waveguide top height (H), slab height (h) and top width ($W_{top}$) of the trimmed waveguide 106 are derived as a function of trimming time as shown in an inset equations (as shown in the FIG. 5).

The contours corresponding to various trimming time (t) show the cross-sectional view of the waveguide 106 at the various instants of RIE. It must be noted that, the width reduction rate ($\alpha$) and height reduction rate ($\beta$) have been assumed to be the same (0.2 µm/min) in this model. During surface trimming, top width ($W_{top}$) of the waveguide 106 is reduced to $W_{top}=W_0-\alpha t$. Similarly, the rib height (H) and slab height (h) are also modified to $H=H_0-\beta t$ and $h=h_0-\beta t$, respectively, as a function of trimming time t.

The bottom width of the waveguide remains as $W_0$ until the slab region is fully etched. Once the slab is completely exhausted the cross-section of the triangular shaped waveguide geometry reduces. Further; the base (height) reduces at a rate of a ($\beta$).

Further, consider, the surface etching duration of t=9 min, then the resulting triangular shaped waveguide cross-section becomes single-mode and supports only the fundamental mode. Therefore, the surface etching chemistry and duration are chosen such that single-mode guiding condition is not violated throughout the trimmed waveguide region (including SSCs at both ends). The calculated intensity distribution profiles indicates that the guided mode-size and its height can be gradually merged from an untrimmed single-mode waveguide to a uniformly trimmed single-mode waveguide, if the maximum etching duration is limited to about 6 minutes. The uniformly trimmed waveguide length and the transition lengths (SSCs) are controlled by the use of the shadow mask. The maximum height reduction of the surface trimmed waveguide within single-mode regime depends on initial waveguide parameters.

Figure 6:
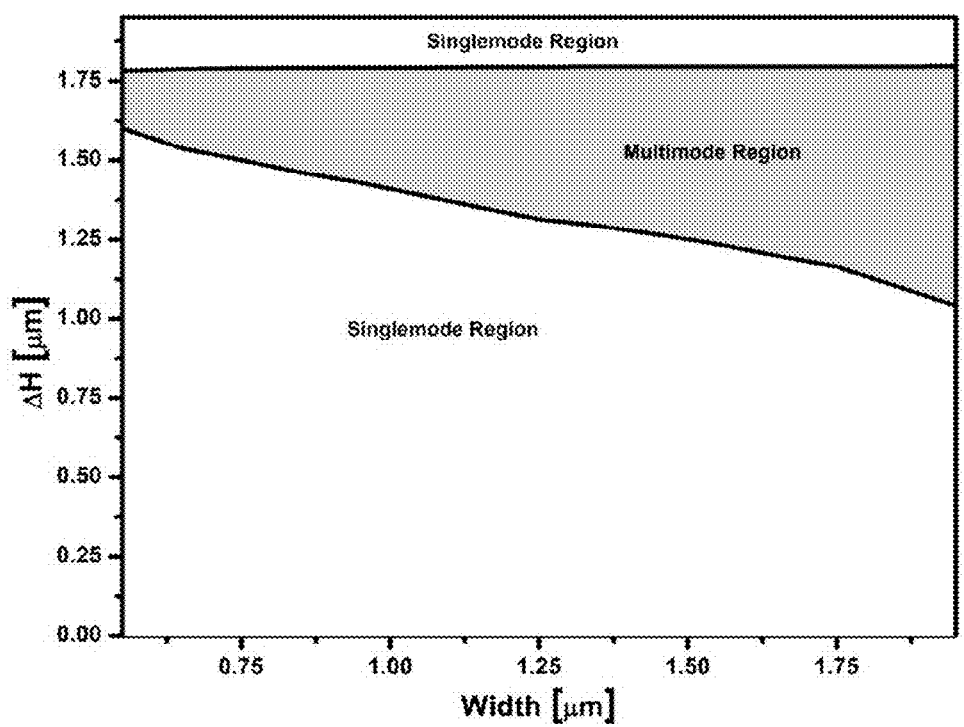
FIG. 6 is a graph illustrating single-mode and multi-mode regions of a surface trimmed waveguide as function of waveguide initial width ($W_0$) and rib height reduction ($\Delta H = H_0 - H$) for $H_0 = 2$ μm ($h_0 = 1.75$ μm), according to the embodiments as disclosed herein.

FIG. 6 is a graph illustrating single-mode and multi-mode regions of a surface trimmed waveguide as function of waveguide initial width ($W_0$) and rib height reduction ($\Delta H=H_0-H$) for $H_0=2$ µm ($h_0=1.75$ µm), according to the embodiments as disclosed herein. It is obvious from the plot that during surface trimming, the single-mode waveguide is modified into a multimode waveguide and again transformed back to the single mode waveguide. The first transition is due to a higher effective index value of a first order mode in the rib region compared to the fundamental mode of the slab. The second transition for the single-mode guidance again is because of the lower effective index value of the first order mode in the rib compared to the bulk index of lower cladding (BOX).

Figure 7A:
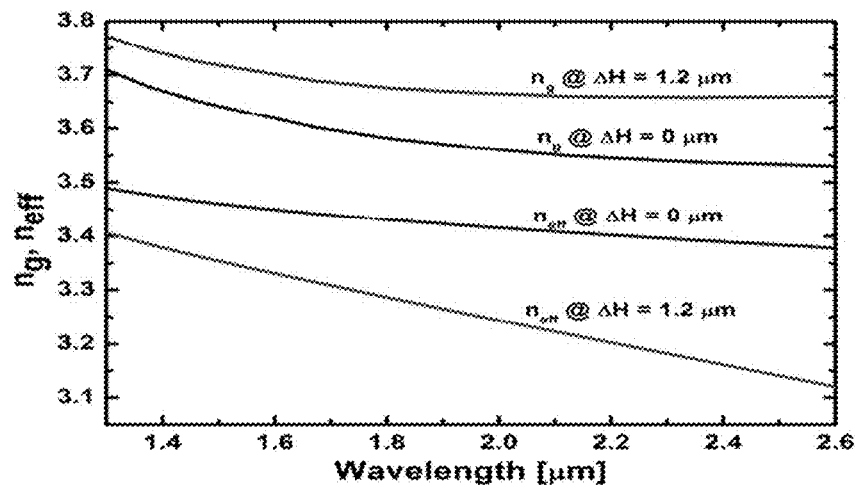
FIG. 7a is a graph illustrating calculated values of group index and effective index as function of wavelength for the waveguide with initial values of $H_0 = 2$ μm, $W_0 = 1.55$ μm and $h_0 = 1.75$ μm, according to the embodiments as disclosed herein.

FIG. 7a is a graph illustrating calculated values of group index and effective index as function wavelength for a waveguide 106 with initial values of $H_0=2$ µm, $W_0=1.55$ µm and $h_0=1.75$ µm, according to the embodiments as disclosed herein. The proposed surface trimming technology for designing locally integrated versatile nonlinear devices for which waveguide dispersion characteristics is an important parameter. The dispersion characteristics can be engineered to a desired value by adjusting the etching duration. The FIG. 7a shows the calculated values of effective index ($n_{eff}$) and group index ($n_g$) comparing an untrimmed and trimmed ($\Delta H=1.2$ mm) waveguides.

Figure 7B:
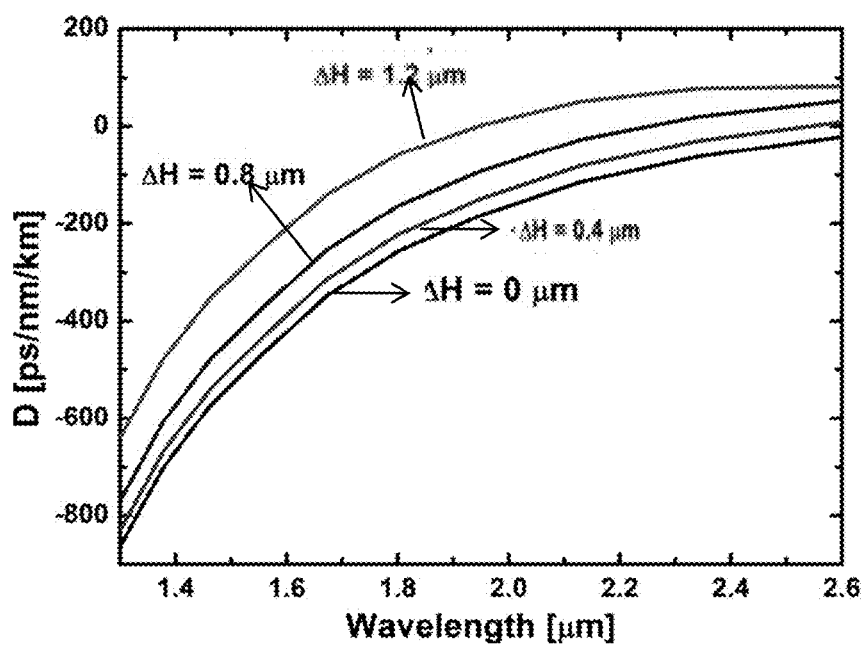
FIG. 7b is a graph illustrating a dispersion parameter as function of wavelength for various values of $\Delta H$, according to the embodiments as disclosed herein.

FIG. 7b is a graph illustrating a dispersion parameter as function of wavelength for various values of $\Delta H$, according to the embodiments as disclosed herein. The FIG. 7b shows the dispersion parameter (D) as a function of operating wavelength for an untrimmed and trimmed waveguides ($\Delta H=0.4$ µm, 0.8 µm, and 1.2 µm), so that the surface trimming can be efficiently used for a dispersion engineering application.

Figure 8A:
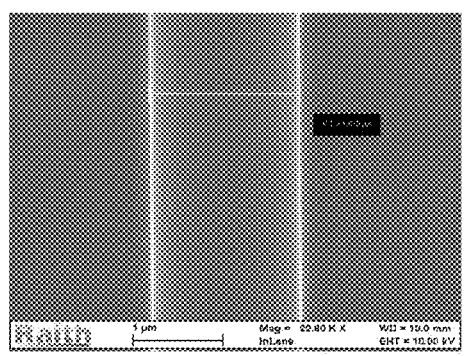
FIG. 8a is a scanning electron microscope (SEM) image of an untrimmed rib waveguide region, according to the embodiments as disclosed herein.
Figure 8B:
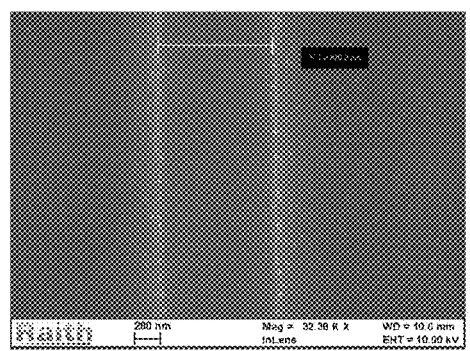
FIG. 8b is a SEM image of a trimmed waveguide region, according to the embodiments as disclosed herein.

FIG. 8a is a SEM image of an untrimmed rib waveguide region. FIG. 8b is a SEM image of the trimmed waveguide region, according to the embodiments as disclosed herein. It is evident that the rib waveguide of width ~1.7 µm has been trimmed down to a submicron waveguide of width ~0.85 µm.

Figure 8C:
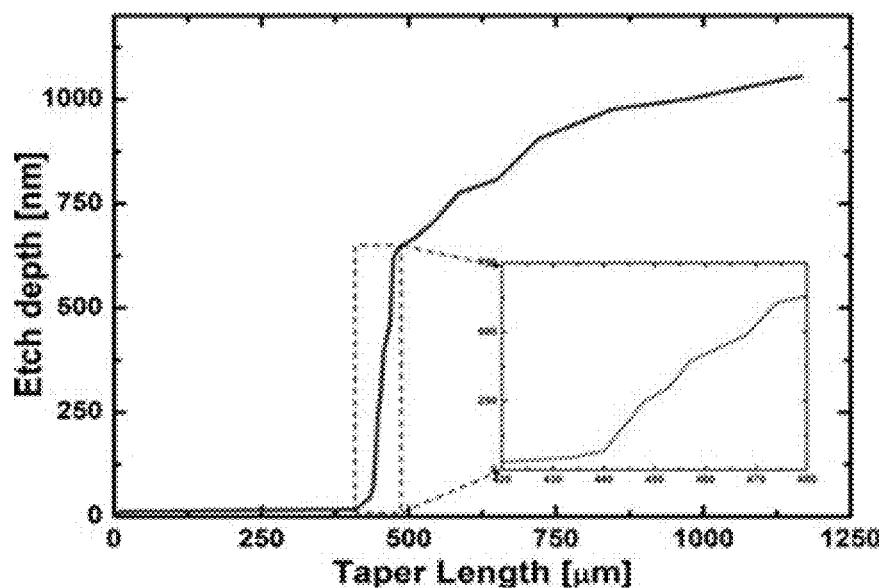
FIG. 8c and FIG. 8d are schematic representations for measured etch depth and width variation of a spot-size converter (SSC), according to the embodiments as disclosed herein.
Figure 8D:
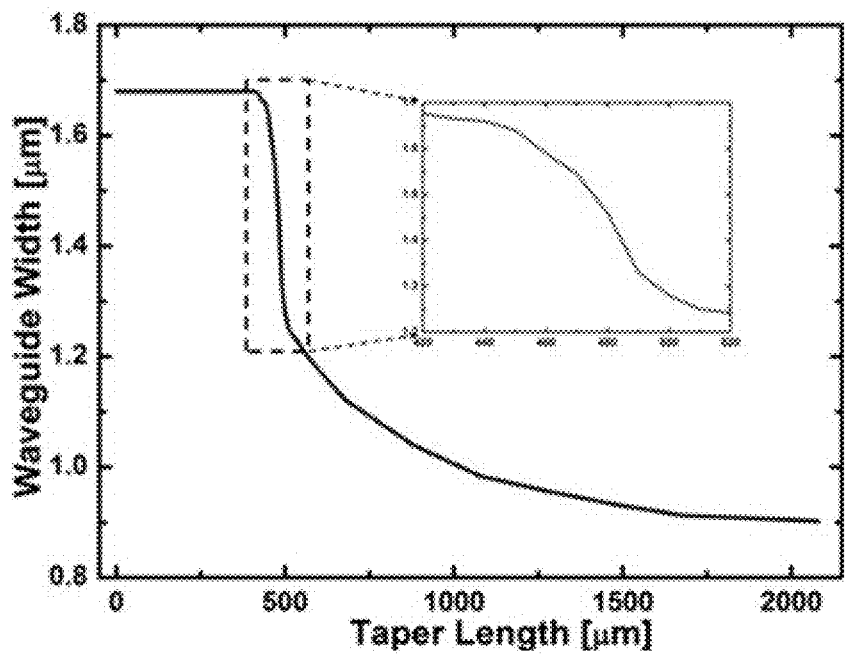

FIG. 8c and FIG. 8d are the measured etch depth and width variation of the SSC, according to the embodiments as disclosed herein. The FIG. 8c represents that the SSC has three distinct height reduction features. The first feature has a measured height reduction of 50 nm for a propagating length of ~430 µm, the second feature has a height reduction of ~600 nm for a propagating length of ~50 µm, and the third feature has a height reduction of ~500 µm for a propagating length of ~550 µm. However, the width reduction has two distinct features (shown in the FIG. 8d): the first feature has Gaussian type width reduction of 400 nm for a propagation length of 70 µm, and the second feature has an exponential type width reduction of 450 nm over a propagation length of ~1 mm. All these fine tapering features can be attributed to a non-uniform distribution of plasma flux near the edges of the shadow mask (cleaved silicon wafer). Further, the slab height surrounding the SSC reduces at the same rate as the rib height. This results into single-mode guidance (λ~1550 nm) throughout. The insertion loss and group index ($n_g$) of the locally defined submicron trimmed waveguides have been extracted by Fabry-Perot resonance technique.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method for modifying dimensions of a waveguide, the method comprising:
    positioning a shadow mask, with an aperture, above the waveguide fabricated on a substrate;
    spatially filtering a substance through the aperture of the shadow mask on a portion of the waveguide, wherein the substance is a vaporizing material deposited with the portion of the waveguide to modify a cladding of the waveguide; and
    obtaining an adiabatic spot size converter at least at one end of the waveguide, by adjusting a distance between the shadow mask and the portion of the waveguide, to modify the dimensions of the waveguide.

2. The method of claim 1, further comprising adjusting a length of the aperture to control length of the portion of the waveguide to be modified.

3. The method of claim 1, wherein the dimensions of the waveguide are at least one of a length of the waveguide, a width of the waveguide, a height of the waveguide, and a cross-section of the waveguide.

4. The method of claim 1, wherein the substance penetrates through the distance between the shadow mask and the portion of the waveguide to obtain the adiabatic spot size converter at the least at one end of the waveguide.

5. The method of claim 1, wherein the portion of the waveguide is trimmed by spatially filtering a reactive plasma through the aperture of the shadow mask in order to reduce the dimensions of a core of the waveguide.

6. The method of claim 5, wherein the portion of the waveguide is trimmed along an axis of the waveguide.

7. The method of claim 5, wherein the portion of the waveguide is trimmed using a reactive ion etching process.

8. The method of claim 3, wherein the length of the waveguide, the width of the waveguide, the height of the waveguide, and the cross-section of the waveguide are modified simultaneously.

9. The method of claim 3, wherein the width of the waveguide and the height of the waveguide are reduced at a rate which is controlled separately.

10. The method of claim 5, wherein the width of the waveguide and the height of the waveguide are reduced based on a composition of the reactive plasma.

11. The method of claim 1, wherein the waveguide is single mode throughout structure of the waveguide comprising modified and unmodified sections.

12. The method of claim 1, further comprising controlling a length of the adiabatic spot-size converter by adjusting the distance between the shadow mask and the portion of the waveguide.

13. The method of claim 1, wherein the portion of the waveguide is deposited with the vaporized material along the axis of the waveguide.

* * * * *